(12) United States Patent
Lee et al.

(10) Patent No.: US 7,675,594 B2
(45) Date of Patent: Mar. 9, 2010

(54) IN-PLANE SWITCHING MODE LIQUID CRYSTAL DISPLAY DEVICE AND METHOD OF FABRICATING THE SAME

(75) Inventors: Man Hoan Lee, Kyongsangbuk-do (KR); Ha Young Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 337 days.

(21) Appl. No.: 11/153,362

(22) Filed: Jun. 16, 2005

(65) Prior Publication Data

US 2005/0280762 A1 Dec. 22, 2005

(30) Foreign Application Priority Data

Jun. 17, 2004 (KR) .................. 10-2004-0044927

(51) Int. Cl.
  *G02F 1/1343* (2006.01)
  *G02F 1/1335* (2006.01)
(52) U.S. Cl. .................................................. 349/119
(58) Field of Classification Search ................. 349/141, 349/119
See application file for complete search history.

(56) References Cited

U.S. PATENT DOCUMENTS

| | | | |
|---|---|---|---|
| 5,784,139 A * | 7/1998 | Chigrinov et al. | 349/117 |
| 6,084,647 A * | 7/2000 | Hatano et al. | 349/15 |
| 6,320,629 B1 * | 11/2001 | Hatano et al. | 349/15 |
| 6,646,701 B2 * | 11/2003 | Lyu et al. | 349/119 |
| 2004/0085496 A1* | 5/2004 | Paukshto et al. | 349/106 |

* cited by examiner

*Primary Examiner*—James A Dudek
(74) *Attorney, Agent, or Firm*—McKenna Long & Aldridge LLP (57) ABSTRACT

An in-plane switching mode liquid crystal display device, comprising first and second substrates attached to face each other; a liquid crystal layer between the first and second substrates; a first polarization film and a second polarization film on the first substrate and the second substrate, respectively, each of the first and second polarization films simultaneously performing an A-plate compensation film function and a polarization function, the first and second polarization films prevent light leakage in a horizontal direction; and a C-plate compensation film positioned on the second substrate, the C-plate compensation film prevents light leakage in a vertical direction.

3 Claims, 6 Drawing Sheets

IN-PLANE SWITCHING MODE LIQUID CRYSTAL DISPLAY DEVICE AND METHOD OF FABRICATING THE SAME

This application claims the benefit of the Korean Application No. P2004-0044927 filed on Jun. 17, 2004, which is hereby incorporated by reference.

BACKGROUND OF THE INVENTION

1. Field of the Invention

The present invention relates to a liquid crystal display device (LCD), and more particularly, to an in-plane switching (IPS) mode LCD and a method of fabricating the same.

2. Discussion of the Related Art

As the performance capabilities of active matrix LCDs rapidly increase, LCDs are being more widely used as flat-type displays in televisions (TVs), portable computers, and monitors. Among active matrix LCDs, a twisted nematic (TN) type LCD is typically used. In the TN-type LCD, electrodes are respectively positioned on two substrates, a director of liquid crystal is arranged to make the director of the liquid crystal have an initial twist angle of 90°, and a voltage is applied to the electrodes to rotate the director of the liquid crystal. The TN-type LCD is favored on the grounds that it provides excellent contrast and color reproducing characteristics.

However, the TN-type LCD has the chronic problem of a narrow viewing angle. To solve the narrow viewing angle problem of the TN-type LCD, an in-plane switching (IPS) mode, where two electrodes are formed on one substrate and a director of a liquid crystal is adjusted by a transverse electric field generated between the two electrodes, has been introduced. A related art IPS mode LCD will be described below.

Figure 1:
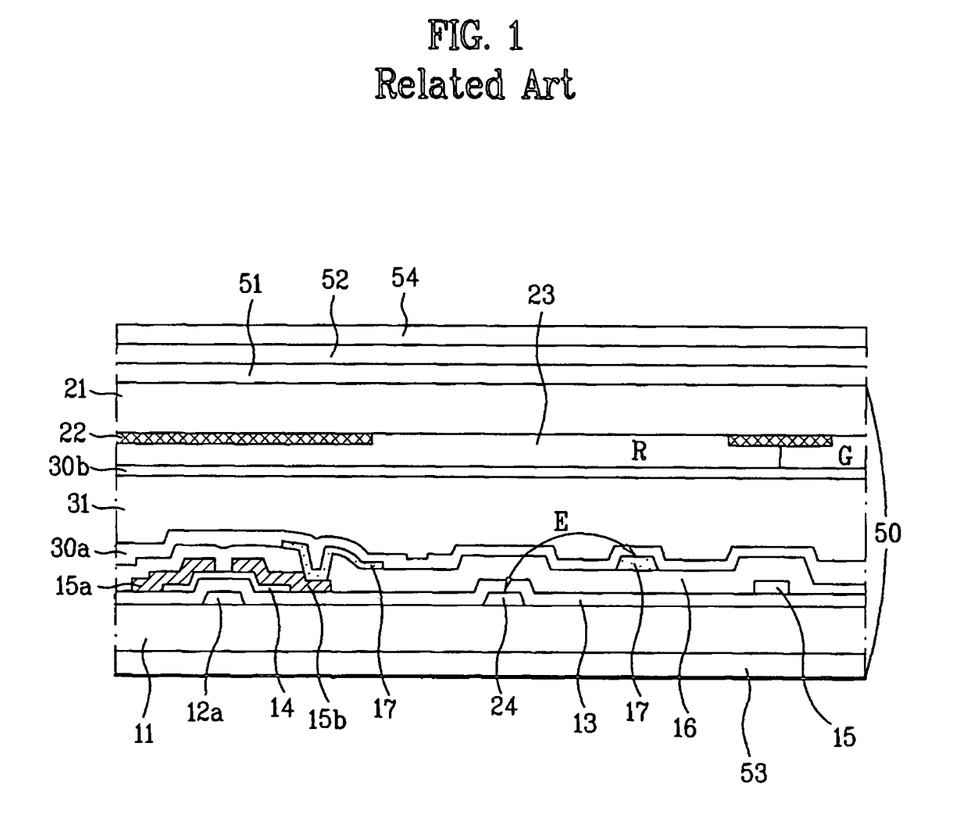
FIG. 1 is a cross-sectional view of a related art IPS mode LCD.
Figure 2:
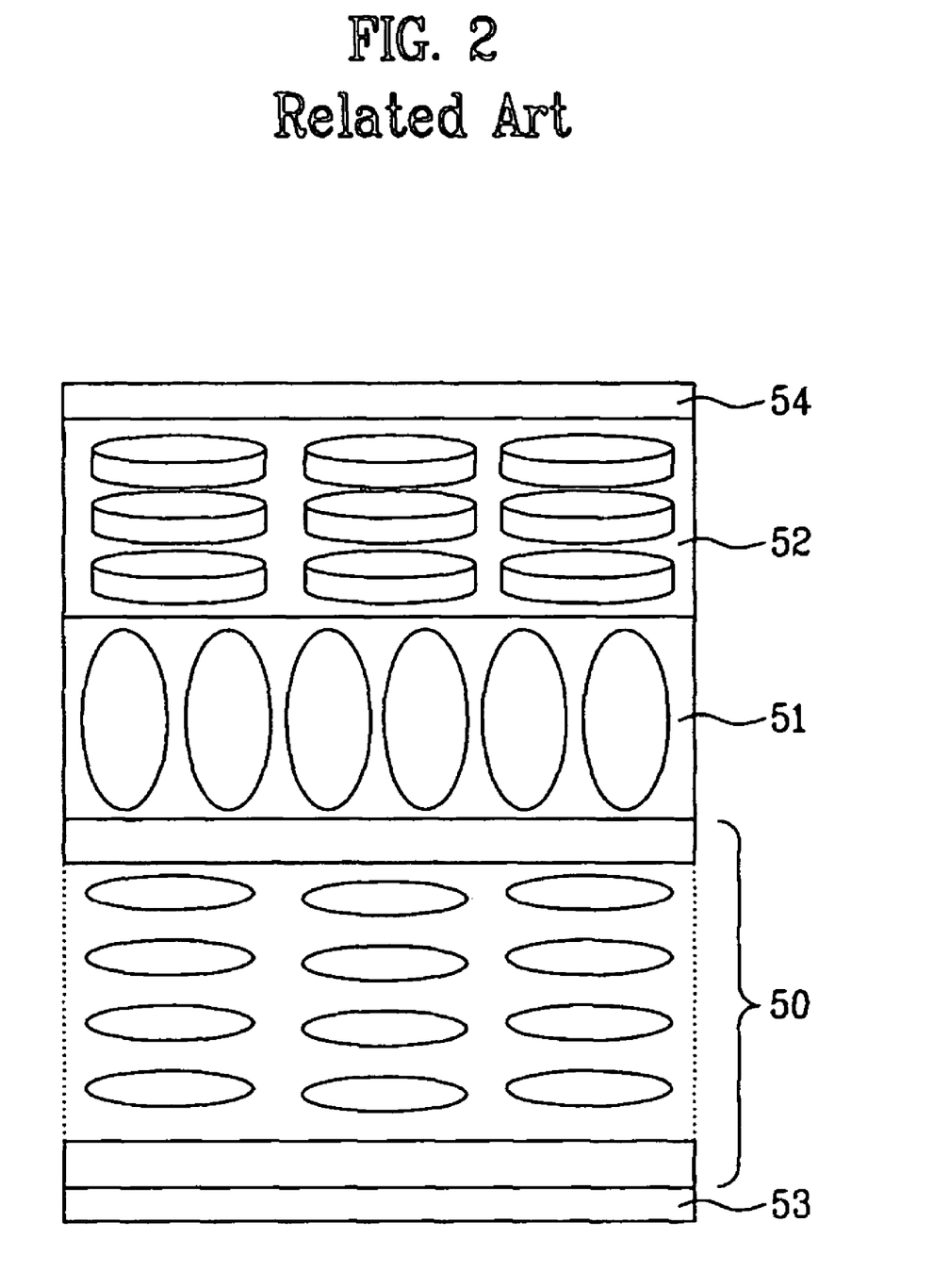
FIG. 2 is a schematic view of the related art IPS mode LCD.
Figure 3:
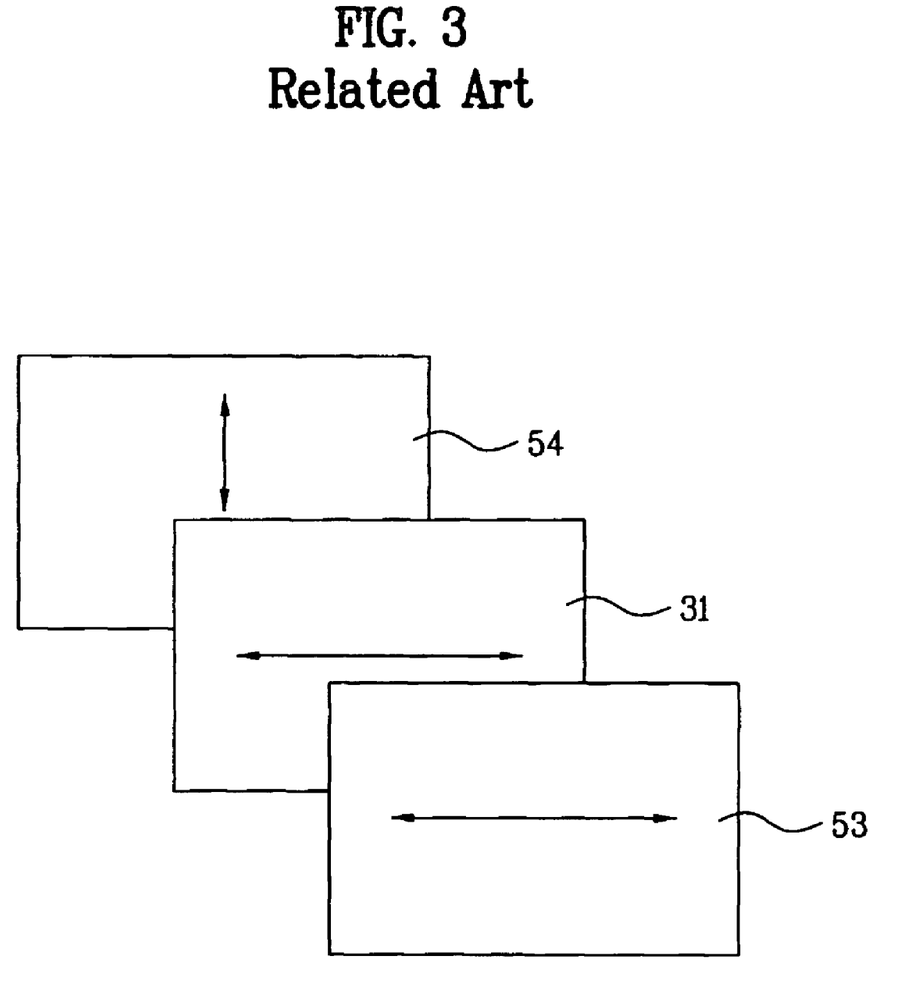
FIG. 3 is a schematic view illustrating directions of a polarization axes in polarization films and the liquid crystal layer in the related art IPS mode LCD.

FIG. 1 is a cross-sectional view of a related art IPS mode LCD. FIG. 2 is a cross-sectional view of a compensation film and a polarization film of the related art IPS mode LCD. FIG. 3 is a schematic view illustrating directions of a polarization axis and liquid crystal in the related art IPS mode LCD.

As shown in FIG. 1, the related art IPS mode LCD includes a color filter array substrate 21, a thin film transistor (TFT) array substrate 11 and a liquid crystal (LC) layer 31 between the color filter array substrate 21 and the TFT array substrate 11. A black matrix layer 22 on the surface of the color filter array substrate 21 prevents light leakage from regions other than the pixel regions. A color filter layer 23, including red, green, and blue filters for reproducing colors, is positioned in respective pixel regions within the black matrix on the surface of the color filter array substrate 21.

Gate lines (not shown) and data lines 15 for defining respective pixel regions are formed on the TFT array substrate 11. TFTs are formed adjacent to where the gate lines and the data lines cross. Common electrodes 24 and pixel electrodes 17 are arranged in an alternately manner on the TFT array substrate 11 for generating a transverse electric field.

The TFT includes a gate electrode 12a branching off from the gate line, a gate insulation film 13 formed over the entire surface of the substrate, including the gate electrode 12a, a semiconductor layer 14 formed on the insulation film 13 that corresponds to the gate electrode 12a, a source electrode 15a formed at one end of the semiconductor layer 14 and a drain electrode 15b branching off from the data line and formed at the other end of the semiconductor layer 14. The pixel electrode 17 is connected to the drain electrode 15b of the TFT via a contact hole passing through a passivation layer 16 so as to receive a data voltage from the TFT. The common electrodes are connected in an integral fashion and provided with a voltage from an external circuit or ground.

The IPS mode LCD has the common electrodes 24 and the pixel electrodes 17 on the same substrate. When a voltage is applied across the two electrodes so as to generate a transverse electric field E, which is horizontal with respect to the substrate, the liquid crystal molecules rotate while maintaining the orientation of the liquid crystal molecules in their horizontal state with respect to the substrate. Alignment layers 30a and 30b are respectively provided on the inner surfaces of the TFT array substrate 11 and the color filter array substrate 21 to initially align the liquid crystal molecules in the liquid crystal layer 31.

A first polarization film 53 and a second polarization film 54 are respectively attached to the outer surfaces of a liquid crystal (LC) panel 50, which includes the two substrates and the liquid crystal layer 31, to transmit only light of a polarization plane in a predetermined direction. An A-plate compensation film 52 and a C-plate compensation film 51 are further provided between the second polarization film 54 and the liquid crystal panel 50 to compensate for a phase change of light due to an inadequate viewing direction. The compensation film and the polarization film of the IPS mode LCD will be described in detail with reference to FIG. 2.

The C-plate compensation film 51 and the A-plate compensation film 52 are further provided at one side of the IPS mode LC panel 50, as shown in FIG. 2. The C-plate compensation film 51 is made of a liquid crystal material having a positive dielectric constant to compensate for a phase in a vertical direction. The A-plate compensation film 52 is made of a liquid crystal material having a negative dielectric constant to compensate for a phase in a horizontal direction. As described above, the IPS mode LCD compensates for the phase using a biaxial film or two compensation films of the A-plate compensation film and the C-plate compensation film.

The first polarization film 53 and the second polarization film 54 are attached to the outermost portions of the LC panel 50, respectively. The first polarization film 53 and the second polarization film 54 are flexible-type films and made of a multilayer film, such as triacetate cellulose (TAC) films, poly vinyl alcohol (PVA) films, protection films, and releasing films. These polarization films transmit only light having a polarization plane in one predetermined direction from natural light, which has polarization planes in all directions of 360°, and absorbs the rest of the light to provide polarized light.

The A-compensation film 52 and the C-compensation film 51 are a coated type and can be formed by coating and hardening the material on the outer or inner surface of the LC panel 50. The C-plate compensation film 51 is coated and hardened on the surface of the LC panel 50, the A-plate compensation film 52 is coated and hardened on the C-plate compensation film 51, and finally, the second polarization film 54 is attached on the A-plate compensation film 52 and the first polarization film 53 is attached on the LC panel at the opposite side. The first polarization film 53 and the second polarization film 54 are attached to the outermost portions of the LC panel 50 and compensation films, by removing releasing film from adhesive sides on the polarization films and applying the adhesive sides of the polarization films to the LC panel 50.

As shown in FIG. 3, the direction of a polarization axis of the second polarization film 54 is set in a direction perpendicular to an alignment direction of the liquid crystal layer 31. The direction of a polarization axis of the first polarization film 53 is set in a direction parallel with an alignment direction of the liquid crystal layer 31.

The above-described IPS mode LCD has the following problems. First, since the compensation film is additionally provided to the LCD, it is difficult to manufacture an LCD with a lightweight and slim profile. Further, time and cost are consumed due to the process of adding the compensation film. Second, when the polarization film is attached to a final product, the releasing film and the protection film of the polarization film should be removed. During the process of removing those films, layers of the multilayer film that has been attached can be exfoliated due to their weak adhesion.

SUMMARY OF THE INVENTION

Accordingly, the present invention is directed to an IPS mode LCD and a method of fabricating the same that substantially obviate one or more problems due to limitations and disadvantages of the related art.

An object of the present invention is to provide a simple process for manufacturing an IPS mode LCD.

Another object of the present invention is to provide an IPS mode LCD with a slim profile.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an in-plane switching mode liquid crystal display device comprising: first and second substrates attached to face each other; a liquid crystal layer between the first and second substrates; a first polarization film and a second polarization film on the first substrate and the second substrate, respectively, each of the first and second polarization films simultaneously performing an A-plate compensation film function and a polarization function, the first and second polarization films prevent light leakage in a horizontal direction; and a C-plate compensation film positioned on the second substrate, the C-plate compensation film prevents light leakage in a vertical direction.

In another aspect, a method for forming an in-plane switching mode liquid crystal display device, comprising: forming a first polarization film and a second polarization film on the first substrate and the second substrate, respectively, each of the first and second polarization films simultaneously performing an A-plate compensation film function and a polarization function, the first and second polarization films prevent light leakage in a horizontal direction; providing a C-plate compensation film on the second substrate, the C-plate compensation film prevents light leakage in a vertical direction; attaching first and second substrates to face each other; and forming a liquid crystal layer between the first substrate and the second substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Reference will now be made in detail to the preferred embodiments of the present invention, examples of which are illustrated in the accompanying drawings.

Figure 4:
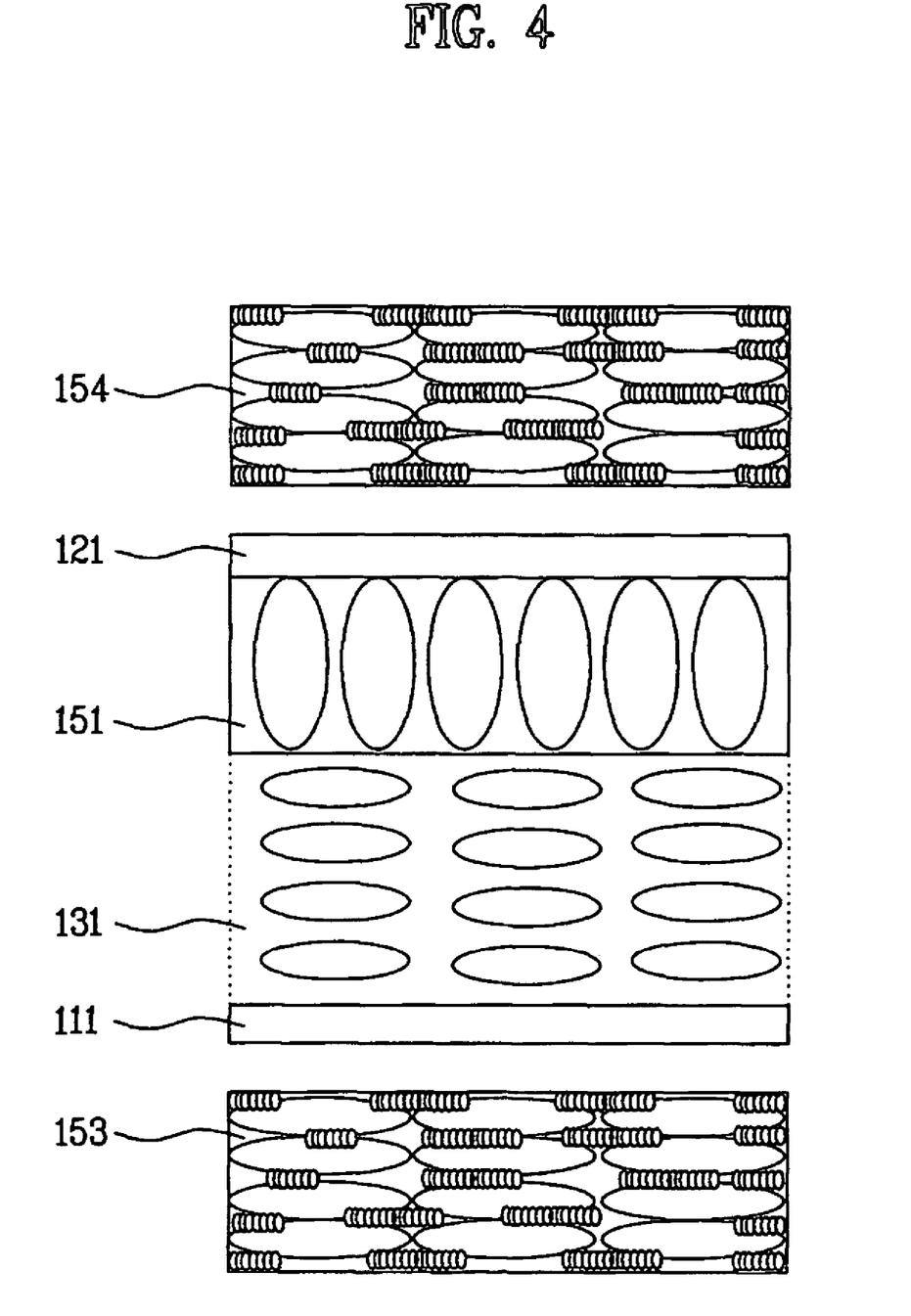
FIG. 4 is a cross-sectional view of an LCD according to a first exemplary embodiment of the present invention.
Figure 5:
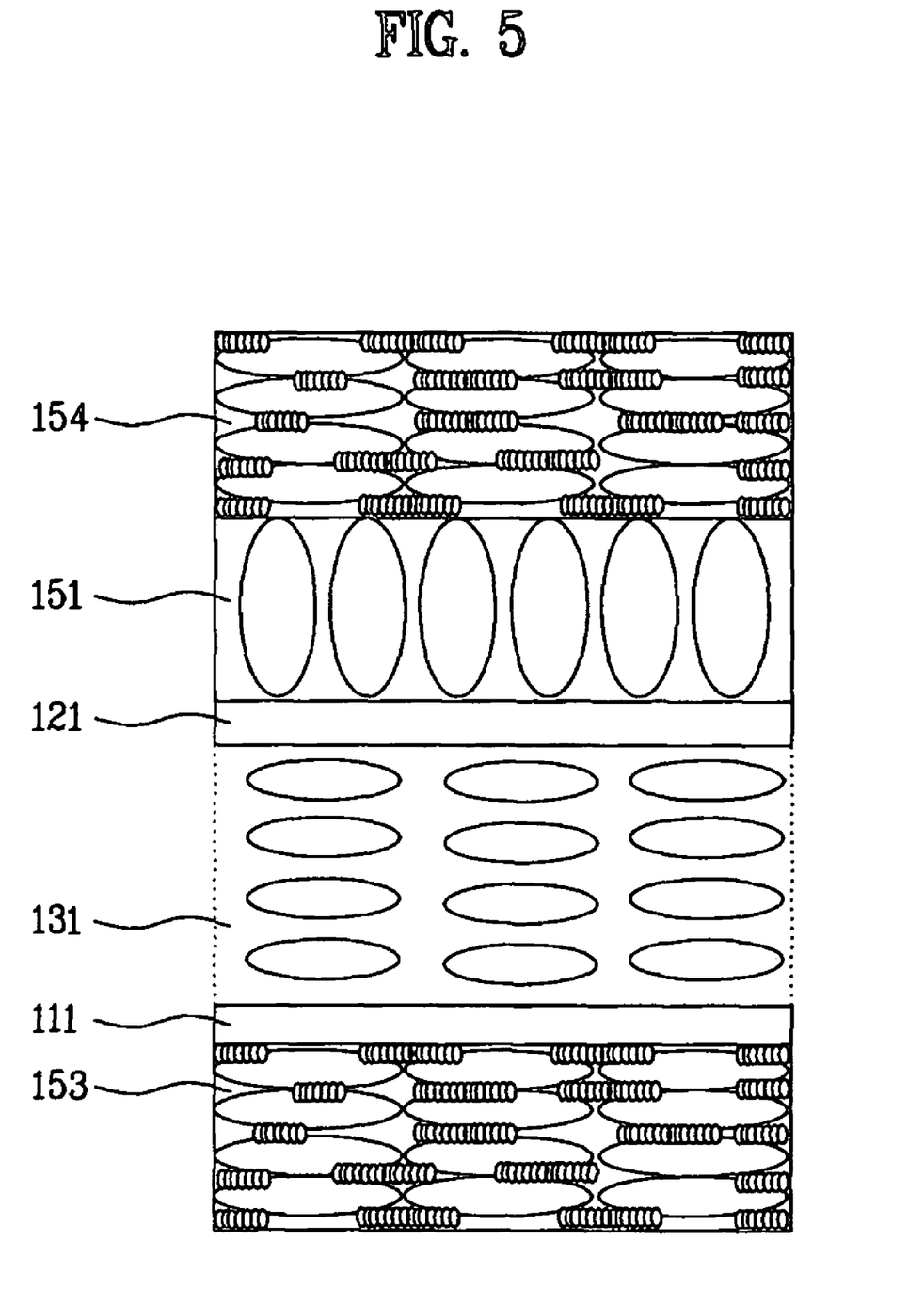
FIG. 5 is a cross-sectional view of an LCD according to a second exemplary embodiment of the present invention.
Figure 6:
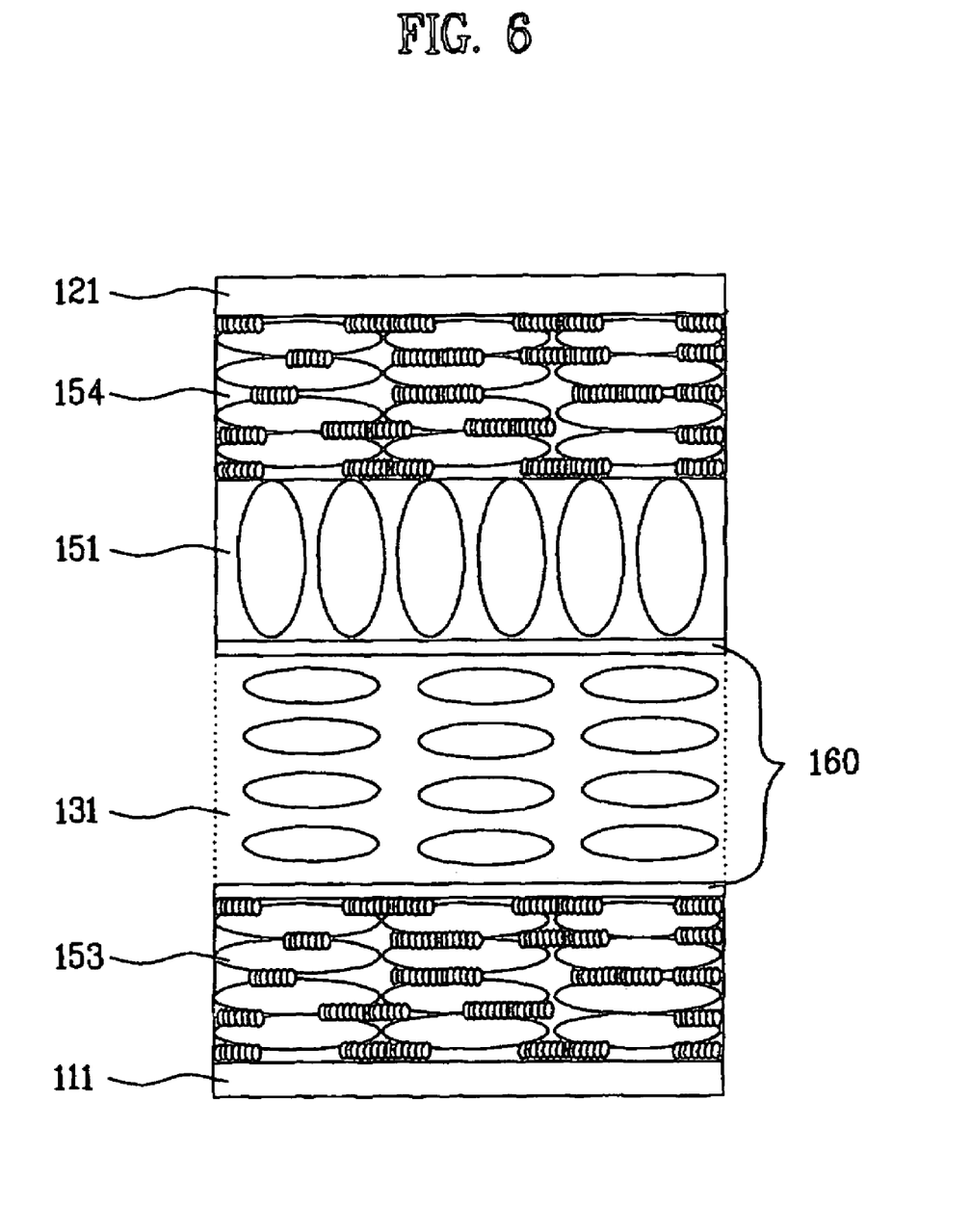
FIG. 6 is a cross-sectional view of an LCD according to a third exemplary embodiment of the present invention.

FIGS. 4 to 6 are cross-sectional views of LCDs according to first through third exemplary embodiments of the present invention.

Referring to FIG. 4, any IPS mode LCD according to the first exemplary embodiment of the present invention includes a first substrate 111 on which gate lines, data lines, TFTs, common electrodes, and pixel electrodes are formed, a second substrate 121 on which a black matrix layer and a color filter layer, including red, green, and blue filters, are formed, a liquid crystal layer 131 in a space between the first substrate 111 and the second substrate 121, a sealant (not shown) functioning as an adhesive to attach the first substrate 111 and the second substrate 121, a first polarization film 153 and a second polarization film 154 attached to the outer surfaces of the first substrate 111 and the second substrate 121, respectively, for simultaneously performing an A-plate compensation film function and a polarizing function, and a C-plate compensation film 151 formed on the inner surface of the second substrate 121.

The liquid crystal layer has a birefringence such that a refractive index for a longer axis direction of a liquid crystal molecule is different from that of a shorter axis direction of a liquid crystal molecule. Refractive index difference is generated by the birefringence, depending on a position from which the LCD is viewed. When linearly polarized light passes through the liquid crystal molecules and is changed in its polarization, a phase difference is generated, so that a light quantity from a position deviating from a front side and a light quantity from the front side are different. Therefore, in the LCD using the liquid crystal material, a contrast ratio change, a color shift, a gray inversion are generated depending on the viewing angle. Further, an undesired light leakage can also occur.

To solve such problems created by a phase difference generated in the panel, phase difference compensation films can be used. The IPS mode LCD indispensably requires an A-plate compensation film to compensate for a light leakage in a horizontal direction and a C-plate compensation film to compensate for a light leakage in a vertical direction. As described above, the first polarization film 153 and the second polarization film 154 for simultaneously performing the function of the A-plate compensation film and the polarizing function and the C-plate compensation film 151 are provided at the first substrate 111 and the second substrate 121 of the IPS mode LCD, according to the first exemplary embodiment of the present invention. Thus, the first polarization film 153 and the second polarization film 154 provide the polarizing function as well as compensate for the light leakage in the horizontal direction.

The polarization axis direction of the second polarization film 154 can be set to a direction perpendicular to an alignment direction of the liquid crystal layer 131 and the polarization axis direction of the first polarization film 153 can be set to a direction parallel with the alignment direction of the liquid crystal layer 131. As described above, generally, the polarization axis direction of the first polarization film 153 is perpendicular to the polarization axis direction of the second polarization film 154.

The first polarization film 153 and the second polarization film 154 are formed by a coating method. That is, these films are formed by coating a material for the polarization film on the outer surfaces of the first and second substrates and hardening the coated material. Unlike the related art polarization film where exfoliation occurs during the attachment/detachment of the releasing film and the protection film, the polarization films of the first exemplary embodiment of the present invention can be formed without causing exfoliation problems.

The first and second polarization films 153 and 154 are formed by adding dye to an indurative host-LC aligned horizontally. The dye is very densely aggregated so that it is not influenced by the localized host-LC's direction, but aligned to the entire host-LC's direction such that a polarization characteristic appears. For example, a dichroic dye can be an example for a dye material.

When the dye is added to nematic host-LC so that a polarization effect appears on the A-plate compensation film, since the material for the polarization film is aligned horizontally. Accordingly, the polarization film and the A-plate compensation film are incorporated into one film, so that the number of the films can be reduced and the thickness of the LCD can be reduced. Thus, the process step of attaching the polarization film can be eliminated by forming the polarization film through the coating method.

The C-plate compensation film 151 is needed for vertically compensating a phase of the light passing through the LC panel. The C-plate compensation film 151 can also be formed by the coating method. According to the first exemplary embodiment of the present invention, the C-plate compensation film 151 is formed on the inner surface of the second substrate 121. However, the C-plate compensation film is not limited to this position.

FIG. 5 is a cross-sectional view of an LCD according to the second exemplary embodiment of the present invention. As shown in FIG. 5, the C-plate compensation film 151 can be also inserted between the second substrate 121 and the second polarization film 154. In other words, the C-plate compensation film 151 can be positioned on the outer surface of the second substrate 121 and on the inner surface of the second polarization film 154.

According to the related art, after the applications of a tensile-type biaxial film or the A-plate compensation film and the C-plate compensation film are formed, the polarization film is attached. In exemplary embodiments of the present invention, the coating-type polarization film and the C-plate compensation film are formed by a coating method. Further, exemplary embodiments of the present invention uses the A-plate compensation film effect of the polarization film by directly manufacturing an in-cell coatable type polarization film on the liquid crystal panel. Therefore, since the host nematic liquid crystal of the in-cell coatable type polarization film realizes the A-plate compensation film characteristic, a separate A-plate film does not need to be manufactured.

Resultantly, it is possible to simultaneously obtain the IPS compensation effect and the polarization film effect using the two films by applying the in-cell coatable type polarization film having the A-plate compensation film effect and the coating-type C-plate compensation film. In another alternative, the first and the second polarization films and the C-plate compensation film can all be formed on the inner surface of the substrate.

FIG. 6 is a cross-sectional view of an LCD according to the third exemplary embodiment of the present invention. As shown in FIG. 6, in the LCD device according to the third exemplary embodiment of the present invention, a first polarization film 153 having the A-plate compensation film effect is formed by coating the first film on an inner surface of a first substrate 111, a second polarization film 154 is formed by coating the second film on an inner surface of a second substrate 121, and a C-plate compensation film 151 is formed by coating the C-plate compensation film 151 on a surface of the second polarization film 154. The polarization film can be formed on the inner surface of the substrate by applying the coating method.

In the meantime, when the first polarization film 153 and the second polarization film 154 and the C-plate compensation film 151 are formed on the inner surface of the substrates, those films can be formed by coating them on the substrates before or after patterns, such as a color filter layer or TFTs, are formed on the substrates.

Referring to FIG. 6, alignment films 160 can be further provided between the first substrate 111, the second substrate 121, and the liquid crystal layer 131. The alignment films 160 control the arrangement directions of the molecules in the liquid crystal layer to be uniform. The direction of the alignment films 160 is determined by a rubbing-process so that the films 160 may have the same direction as the polarization direction of one of the first polarization film and the second polarization film.

The LCD according to exemplary embodiments of the present invention has the following advantages. First, in the IPS mode LCD where the A-plate compensation film, the C-plate compensation film, and the polarization film should be used, a separate A-plate compensation film does not need to be manufactured when a polarization film is used that performs the functions of both the A-plate compensation film and the polarization film simultaneously. Therefore, the number of the films can be reduced, so that a light weight and slim profile LCD can be manufactured. Further, the manufacturing cost and number of processes can be reduced by eliminating the use of the film that is just used as an A-plate compensation film. Second, since the polarization film of embodiments of the present invention is formed by the coating method, the problem of exfoliation of layers, generated when the related art polarization film manufactured in the form of the multi-player film is attached to the liquid crystal panel, can be prevented.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An in-plane switching mode liquid crystal display device, comprising:
    a first and second substrates attached to face each other, the first substrate having gate lines, data lines, thin film transistors, common electrodes and pixel electrodes thereon, and the second substrate having a black matrix layer and color filter layers;
    a liquid crystal layer between the first and second substrates, the liquid crystal layer having a birefringence such that a refractive index for a longer axis direction of a liquid crystal molecule is different from that of a shorter axis direction of liquid crystal molecule;
    a first polarization film and a second polarization film on the first substrate and the second substrate, respectively, each of the first and second polarization films simultaneously performing an A-plate compensation film function and a polarization function, the first and second polarization films preventing light leakage in a horizontal direction, wherein the first and second polarization films are formed by adding dichroic dye to a liquid crystal, wherein a polarization axis of the second polarization film is set to a direction perpendicular to an alignment direction of the liquid crystal layer, and a polarization axis of the first polarization film is set to a direction parallel with the alignment direction of the liquid crystal layer; and
    a C-plate compensation film positioned between the second substrate and the liquid crystal layer, the C-plate compensation film preventing light leakage in a vertical direction.

2. The liquid crystal display device of claim 1, wherein the first and second polarization films are on one of an outer surface and an inner surface of the first substrate and one of an outer surface and an inner surface of the second substrate, respectively.

3. An in-plane switching mode liquid crystal display device, comprising:
    a first and second substrates attached to face each other, the first substrate having gate lines, data lines, thin film transistors, common electrodes and pixel electrodes thereon, and the second substrate having a black matrix layer and color filter layers;
    a liquid crystal layer between the first and second substrates, the liquid crystal layer having a birefringence such that a refractive index for a longer axis direction of a liquid crystal molecule is different from that of a shorter axis direction of liquid crystal molecule;
    a first polarization film and a second polarization film on inner surfaces of the first and the second substrates, respectively, each of the first and second polarization films simultaneously performing an A-plate compensation film function and a polarization function, the first and second polarization films preventing light leakage in a horizontal direction, wherein the first and second polarization films are formed by adding dichroic dye to a liquid crystal;
    a C-plate compensation film on the second polarization film for preventing light leakage in a vertical direction;
    a first alignment film between the first polarization film and the liquid crystal layer; and
    a second alignment film between the C-plate compensation film and the liquid crystal layer, wherein the first and second alignment films have the same direction as a polarization direction of one of the first and second polarization films.

* * * * *